United States Patent [19]

Thrane

[11] Patent Number: 4,856,061

[45] Date of Patent: Aug. 8, 1989

[54] METHOD FOR CRYPTOGRAPHIC TRANSMISSION OF SPEECH SIGNALS AND A COMMUNICATION STATION FOR PERFORMING THE METHOD

[75] Inventor: Lars Thrane, Soborg, Denmark

[73] Assignee: S.P. Radio A/S, Alborg, Denmark

[21] Appl. No.: 687,153

[22] Filed: Dec. 28, 1984

[30] Foreign Application Priority Data

Dec. 30, 1983 [DK] Denmark .............................. 6084-83

[51] Int. Cl.[4] ........................ H04L 7/00; H04L 25/38

[52] U.S. Cl. .......................................... 380/48; 380/23

[58] Field of Search ............... 128/22.11, 22.13, 22.16, 128/22.17; 179/1.5 R; 380/21, 28, 30, 48, 43, 23

[56] References Cited

U.S. PATENT DOCUMENTS

| | | | |
|---|---|---|---|
| 3,970,791 | 7/1976 | Johnson | 380/49 |
| 4,086,435 | 4/1978 | Graupe et al. | 380/49 |
| 4,091,423 | 5/1978 | Branscome | 380/43 X |
| 4,185,166 | 1/1980 | Kinch, Jr. et al. | 380/43 |
| 4,218,582 | 8/1980 | Hellman et al. | 178/22.11 |
| 4,268,720 | 5/1981 | Olberg et al. | 380/53 |
| 4,434,323 | 2/1984 | Levine et al. | 178/22.17 |
| 4,453,074 | 6/1984 | Weinstein | 380/30 |
| 4,458,109 | 7/1984 | Mueller-Schloer | 178/22.11 |
| 4,642,424 | 2/1987 | McNair | 380/48 |
| 4,723,284 | 2/1988 | Munck et al. | 380/28 X |

FOREIGN PATENT DOCUMENTS

| | | |
|---|---|---|
| 0064779 | 7/1982 | European Pat. Off. . |
| 0089632 | 3/1983 | European Pat. Off. . |
| 2020513 | 11/1979 | United Kingdom . |
| 8101933 | 12/1980 | World Int. Prop. O. . |

OTHER PUBLICATIONS

Lagger et al., "Sicherheitsaspekte in Rechnergesteuerten Kommunikationssystemen", *Elektronische Rechenanlagen,* (12/80; pp. 276–280).

Patent Abstracts of Japan, vol. 7, No. 62, Mar. 15, 1983, Atsushi Yamashita, "Managing System for Key for Encyrotion Communication", No. 57–207453.

Journal of the Assoc. For Computing Machinery, vol. 21, No. 2, Feb. 1978, pp. 120–126, Rivest et al., "A Method for Obtaining Digital Signatures . . . ".

*Primary Examiner*—Stephen C. Buczinski
*Assistant Examiner*—Bernarr Earl Gregory
*Attorney, Agent, or Firm*—Robert J. Koch

[57] ABSTRACT

In a communication system, in which a great number of communication stations operate on the same telecommunication channel, such as a radio frequency, secret information transfer for selective calls as well as group calls is secured by cryptographic transmission of speech signals, in which enciphering and deciphering of the speech signals in transmitting and receiving stations, respectively, are performed by means of a secret binary transformation code associated selectively with the speech communication in question.

By adding a communication identification signal generated in each participating station as an unambiguous irreversible function of the transformation code to start and stop commands initiating and finalizing, respectively, the cryptographic speech transmission from a sending station to one or more receiving stations, as well as to synchronizing signal which may possibly be transmitted during a speech communication and utilizing these communication identification signals as a criterion for initiation and finalization of deciphering of speech signals in the receiving station or stations, a further security is obtained against disturbance or the cryptographic information transfer by third parties through introduction of false messages or commands.

4 Claims, 1 Drawing Sheet

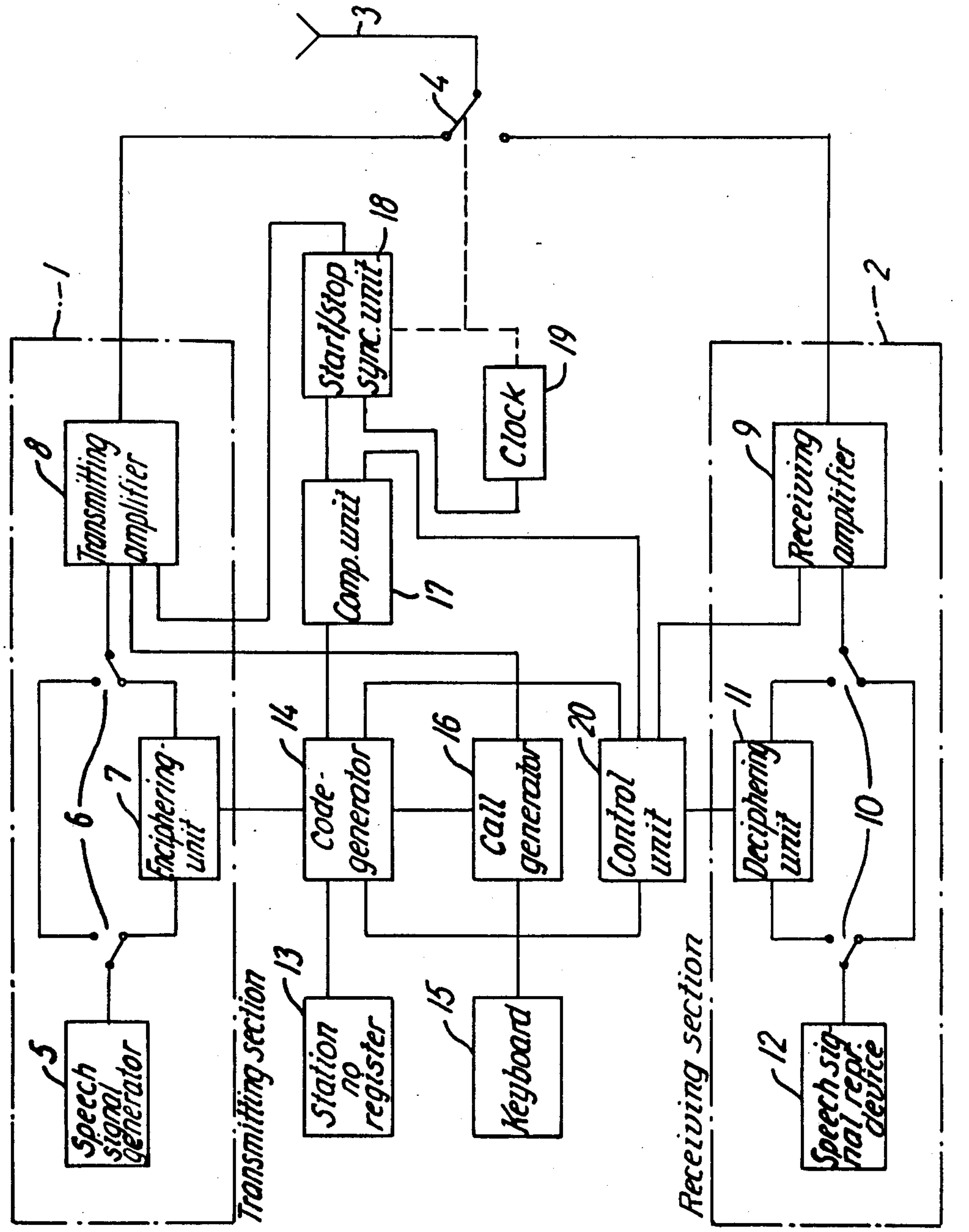
Transmitting section
Receiving section
Speech signal generator
Enciphering unit
Transmitting amplifier
Start/stop sync. unit
Comp. unit
Clock
Code-generator
Call generator
Control unit
Station no register
Keyboard
Receiving amplifier
Deciphering unit
Speech signal repr. device

METHOD FOR CRYPTOGRAPHIC TRANSMISSION OF SPEECH SIGNALS AND A COMMUNICATION STATION FOR PERFORMING THE METHOD

The invention relates to a method for cryptographic transmission of speech signals by selective calls or group calls between at least two communication stations in an open communication system through a single public telecommunication channel, in which enciphering and deciphering of speech signals in transmitting and receiving stations, respectively, are performed by means of a secret binary transmission code associated selectively with the speech communication in question, the cryptographic speech signal transmission being initiated and finalized by the transmission of start and stop commands, respectively, synchronizing signals being transmitted in dependence on the duration of the speech communication.

The object of cryptographic transmission of information signals is, on one hand, to keep messages transmitted from a sender to a receiver secret and, on the other hand, to prevent the introduction of false unauthorized messages in an existing communication. The secrecy is provided by transforming or enciphering the plain text message of the sender by means of a secret transformation key or code into a signal form, which makes it impossible for a third party to discriminate the information content of the message. In the receiver, the original plain text message is regenerated by deciphering the transmitted message by means of a transformation code, which is inverted with respect to that used in the enciphering operation.

In classic cryptography, it is considered a prerequisite for keeping the transformation code secret that this code, which must be known to the sender and the receiver, but kept secret for third parties, is communicated between the participating parties through a communication channel different from that used for the enciphered messages, and this different communication channel must to the extent possible be protected against third parties' retrieval of the secret code.

With this decisive prerequisite requiring secret communication of the transformation code prior to the information transfer as such, the use of cryptographic signal transmission has up until now been limited to closed communication systems particularly for military and diplomatic purposes, whereby enciphered information transfer through public telecommunication channels, such as radio channels, which are accessible for third parties, is combined with a secret transfer of transformation codes, for instance by courier mail.

The classical problem in the known uses of cryptography has been the provision of a sufficiently high degree of certainty for secrecy of the transformation codes by the selection of the safest possible communication channels for the code communication, on one hand, and by continuous efforts for the provision of so-called "unbreakable" codes, on the other hand, cf. e.g. C. E. Shannon "Communication Theory of Secrecy Systems", Bell System Technical Journal, Vol. 28, October 1949, pages 656 to 715.

In practice, the above mentioned prerequisite of separate preceding code communication and the increasing complexity of the transformation codes in the classical cryptography caused by the efforts to secure effective code secrecy has prevented a more wide-spread use of cryptographic transmission systems for private information transfer communications between parties who are not identified beforehand in open communication systems, access to which is possible, in principle, to anybody.

It is the object of the invention to provide possibility for secret transfer of information, particularly in the form of speech signals, in such open communication systems through application of more modern cryptographic coding systems involving essentially less complicated and, thus, cheaper enciphering and deciphering operations than in the classical cryptography and without any requirement of code communication through separate secret communication channels.

The starting point for the invention is the new development of cryptographic information transfer systems described by Whitfield Diffie and Martin E. Hellman in the article "New Directions in Cryptography", IEEE Transactions on Information Theory, Vol. IT 22, No. 6, November 1976, under the designation "Public key distribution systems".

This technique is based on the use of so-called "computationally safe" codes, which can be generated in an unambiguous way of the parties taking part in an information transfer on the basis of code information transmitted together with the enciphered information messages. In this context, by the term "computationally safe" is to be understood that there is no absolute unconditional safety per se against the risk that a third party by computing backwards from the transmitted code information which is directly accessible can obtain knowledge about the basic transformation code, but that the operations required for this purpose constitute, in practice, an infeasible task with respect to the amount of computations and the costs following therefrom.

The technique described in the article is directed towards an open communication system with an arbitrary number of associated users, to each of whom an arbitrary number $X_i$ is assigned, about which only the user in question has knowledge, whereas for each user as a selective call number, the number $$Y_i = a^{X_i}$$

is entered into a publicly accessible register together with the name and address of the user.

In a communication between two users i and j, the transformation code $$K_{ij} = a^{X_i X_j}$$

is used, said code being generated by a selective call from a calling to a called station by the operation $$K_{ij} = Y_j^{X_i} = a^{X_j X_i}$$

and in the called station by the operation $$K_{ij} = Y_i^{X_j} = a^{X_i X_i}$$

In connection with the call, both the call number $Y_j$ of the called station j, and the call number $Y_i$ of the calling station i itself are transmitted from the calling station, and on the basis of these numbers it is a simple computing operation to generate the transformation code, whereas for third parties it is not possible to generate the code without knowledge of one of the secret station numbers $X_i$ or $X_j$.

Thus, this coding principle is based on the fact that in practice it is a computationally infeasible task to compute $X_i$ as $$X_i = \log_a Y_i$$

Based on the technique described in the article, the invention is directed in particular to communication systems, in which a large number of communication stations operate on the same telecommunication channel, for example a radio frequency, such as is typical in communications between fishing vessels. For communication systems of this kind, the technique described in the article will provide possibilities for selective calls and secret information transfer between a calling and a called station.

For communication systems of this kind, it is the object of the invention to provide a further security against disturbance of cryptographic information transfer in case of selective calls between two participating stations, as well as group calls involving more participating stations through introduction of false messages or command signals by third parties.

In order to achieve this, the method according to the invention is characterized in that a communication identification signal which is an unambiguous irreversible function of the transformation code is added to said start and stop commands and synchronizing signals, and that deciphering of speech signals in the receiving station or stations are only initiated and finalized by means of said start and stop commands at correspondence between the communication identification signals thus transmitted and an identification signal generated internally in the station in question from the same transformation code.

By the addition of such a communication identification signal and the use of this signal as a condition for deciphering in the receiving station or stations, a number of different speech communications established by selective calls or group calls may exist at the same time on the common communication channel, on which all stations in the system are operating, without interfering with one another, security being also provided against a third party's malicious intrusion into an existing communication.

The condition that the communication identification signal has to be an unambiguous irreversible function of the transformation code associated selectively with the speech communication in question is to be understood as an absolute unconditional security against regeneration of the transformation code from the transmitted communication identification signals, implying that whereas a given transformation code must in an unambiguous way have one particular corresponding communication identification signal, it may not be possible to compute backwards from the identification signal to the transformation code in an unambiguous way.

In a preferred embodiment of the method according to the invention, the communication identification signal is generated as a residual polynomial by division of the transformation code occurring in the form of a binary polynomial with a predetermined binary polynomial.

In addition, the invention relates to a communication station for performing the method, said station comprising a transmitter section with an associated speech signal generator, and an enciphering unit and a receiving section with an associated speech signal reproducing device and a deciphering unit, a code generator being connected to the enciphering and deciphering units for generating the secret transformation code associated selectively with the speech communication, and a unit controlled by a transmitting/receiving switch being provided for the generation of start and stop commands to initiate and finalize a speech transmission in a transmitting mode of the station, as well as synchronizing signals in dependence on the duration of the speech transmission between said start and stop commands.

According to the invention such a communication station is characterized in that a computation unit is connected to the code generator for generating a communication identification signal as an unambiguous irreversible function of the transformation code, said computation unit being connected to said unit for generating start and stop commands and synchronizing signals, on one hand, for adding the communication identification signal to said start and stop commands and synchronizing signals and, on the other hand, to a control unit for the deciphering unit for actuating and deactuating said deciphering unit by means of incoming start and stop commands only at correspondence between the identification signal generated by the computation unit and communication identification signals which are transmitted with the incoming start and stop commands and synchronizing signals in the receiving mode.

In the following, the invention will be further explained with reference to the drawing, showing a schematical block diagram of an embodiment of a communication station according to the invention.

In the communication station shown in the figure, a transmitting section 1 and a receiving section 2 are connected to antenna 3 through a transmitting/receiving switch 4.

The transmitting section 1 comprises a speech signal generator, such as a microphone 5, which by means of a plain text/cryptography switch 6 may be connected either directly or through an enciphering unit 7 to a transmitting amplifier 8, the output of which is connected to the transmitting/receiving switch 4. In a similar manner, the receiving section 2 comprises a receiving amplifier 9 connected to the transmitting/receiving switch 4 and being connectable by means of a plain text/cryptography switch 10 either directly or through a deciphering unit 11 to a speech signal reproducing device, such as a loudspeaker 12.

In the embodiment shown, the communication station is designed for use in an open communication system, in which a number of stations are operating on the same telecommunication channel, such as a radio frequency, e.g. for application in radio telephone equipment on board fishing vessels for the transmission of speech signals either directly as plain text messages, or in enciphered form, such as explained in the following.

In accordance with the technique described in the above mentioned article, there are assigned to the station a secret station number $X_i$, on one hand, which is unknown to all other stations and, on the other hand, a selective call number $$Y_i = a^{X_i}$$

which is entered into a publicly available register, such as a radio telephone directory for the communication system in question. The base numeral a linking the selective call number $Y_i$ with the secret station number $X_i$ may, for instance, be the base numeral e for the natural logarithms.

The secret station number $X_i$ is stored in a register 13 which is connected to a code generator 14 for generating the transformation codes associated selectively with cryptographic speech communications. The code generator 14 is connected directly to the enciphering unit 7.

For the purpose of entering a call number either in the form of a selective call number for a particular other station in the communication system, or in the form of one of a group of call numbers reserved specifically for group calls, a keyboard 15 is provided which is connected to a call generator 16 connected to the code generator 14, on one hand, and to the transmitting amplifier 8, on the other hand.

By a selective call from the station, the call number $Y_j$ of the call station is entered by means of the keyboard 15 and is transferred therefrom to the call generator 16, from which the call number $Y_j$ of the called station is transferred to the code generator 14, on one hand, and, together with the call number $Y_i$ of the station itself is transferred as a call signal to the transmitting amplifier 8, from which in the position shown of the transmitting-/receiving switch 4, the call signal is transmitted through the antenna 3, on the other hand.

On the basis of the secret station number $X_i$ and the entered call number $Y_j$ of the called station, the transformation code $$K_{ij}=a^{X_j X_i}$$

selectively associated with the communication in question is now computed in the code generator 14, the number a being e.g. the natural logarithm base e. This transformation code is supplied to the enciphering unit 7.

The transformation code is generated in the code generator 14 in the form of a binary polynomial and is further supplied according to the invention from the code generator 14 to a computation unit 17, in which a communication identification signal is provided in the form of the residual polynomial obtained by dividing the transformation code with a predetermined binary polynomial which is the same for all stations in the communication system in question. The communication identification signal is supplied from the computation unit 17 to a unit 18 controlled by the transmitting-/receiving switch 4 for providing start and stop commands for the initiation and finalizing, respectively, of a cryptographic speech communication and possibly synchronizing signals which are transmitted with suitable intervals, e.g. 70 seconds, in the course of a speech communication of longer duration, a clock 19 also controlled by the transmitting/receiving switch 4 being connected to the unit 18 for the generation of these synchronizing signals.

The unit 18 may be actuated, for instance, by means of a separate speech key, not illustrated, for the transmission of the start command with the added communication identification signal. Furthermore, there may be associated with the unit 18 a signal lamp, not illustrated, which is lit at the transmission of the start command as an indication of the fact that speech transmission from the station may start. At the end of the message in question, the speech key is deactuated for the transmission of the stop command with the added communication identification signal and extinguishing the signal lamp. Moreover, the speech key is coupled with the transmitting/receiving switch 4 in such a way that at deactuation of the speech key, the latter will be switched to the position not shown in the figure, in which the station is ready for receiving. The receiving position is the normal position for the switch 4, whereas the position shown in the figure is only assumed at the transmission of call signals or information signals, either as plain text messages or in enciphered form, from the station.

In the receiving position of the switch 4, a call signal having the form $Y_i$, $Y_j$ from another station j in the communication system in question will be transferred from the receiving amplifier 9 to a control unit 20 to cause actuation, on one hand, of an acouistic signal generator, not shown, which is connected to the control unit and, on the other hand, to transfer of the call number $Y_j$ of the calling station from the control unit 20 to the code generator 14, which will then compute the transformation code $K_{ij}$ in the manner described above on the basis of the supplied call number and the secret number $X_i$ of the station itself. The transformation code thus computed is supplied from the code generator 14 to the control unit 20, on one hand, and to the computation unit 17, on the other hand, whereby the latter in the manner described above will again generate an identification signal as a residual polynomial obtained by dividing the transformation code with the predetermined binary polynomial, but will in this case supply the identification signal to the control unit 20.

In the control unit 20, the inverted transformation code to be used in the deciphering operation in the unit 11 is generated, and this inverted code is supplied to the deciphering unit 11 in dependence on the receipt in the station of transmitted start and stop commands with added identification signals from a co-communicating station.

These transmitted start and stop commands are supplied from the receiving amplifier 9 to the control unit 20, in which the communication identification signal transmitted in addition to these commands are compared to the internally generated identification signal supplied from the computation unit 17, so that actuation of the deciphering unit 11 and supply of the inverted transformation code thereto, as well as deactuation of the deciphering unit 11 in connection with a received stop command is made conditional upon correspondence between the transmitted and the internally generated identification signals.

In group calls with the participation of several communication stations, the used transformation code must, in principle, be appointed beforehand between the participating stations in essentially the same manner as in classical cryptography. In connection with the invention, group calls may be realized in that a group of a predetermined call numbers in the total series of call numbers for the communication system is reserved to group calls each with a selectively associated transformation code, which can be generated directly by the code generator 14 by supplying the call number in question to the code generator from the key board 15 through the call generator 16. However, with a limited number of participants in a group call, it is possible for a calling station by preceding selective calls to send information on the group call number in enciphered form to the other participating stations.

The control unit 20 may be connected with a signal lamp, not illustrated, which is lit and extinguished by actuation and deactuation, respectively, of the deciphering unit 11.

In the same manner as known per se from usual telephone equipment, there may be associated with the keyboard 15 a quick selection register, in which a number of preselected call numbers for other stations in the communication system may be entered, and in connection with each call, also the called number so that repetition may take place without entering the complete number anew. Moreover, there may be an associated register containing all the call numbers reserved for group calls, so that a quick selection of one of these numbers may take place by operation of a particular function key.

I claim:

1. A method for cryptographic transmission of speech signals by selective calls or group calls between at least two communication stations in an open communication system through a single public telecommunication channel comprising the steps of:

enciphering speech signals in a transmitting station utilizing a secret binary transformation code associated with a particular cryptographic transmission;

initiating and finalizing said cryptographic transmission by transmission of respective start and stop commands;

generating and transmitting synchronizing signals based upon duration of said cryptographic communication;

producing a transmitting station generated communication identification signal which is an unambiguous irreversible function of said transformation code;

adding said start and stop commands and said synchronizing signals to said communication identification signal;

deciphering said speech signals in a receiving station utilizing said secret binary transformation code;

producing a receiving station generated identification signal from said transformation code;

initiating and finalizing said deciphering of speech signals in accordance with said start and stop commands only upon correspondence between said transmitting station generated communication identification signal and said receiving station generated identification signal.

2. A method as in claim 1, wherein said communication identification signal is produced as a residual polynomial by division of said transformation code, occurring as a binary polynomial by a predetermined binary polynomial.

3. A communication station for cryptographic transmissions of speech signals by selective calls or group calls between at least two communication stations in an open communication system comprising:

a transmitter section containing means for generating a speech signal and an enciphering unit responsive to said means for generating a speech signal;

a receiving section containing a deciphering unit and means for reproducing a speech signal responsive to said deciphering unit;

means for generating a secret transformation code, selectively associated with a speech communication, connected to said enciphering unit and linked to said deciphering unit;

means for generating start and stop commands to initiate and finalize a speech transmission in a transmitting mode and synchronizing signals based on duration of said speech transmission responsive to a transmitting/receiving switch;

means for producing a communication identification signal as an unambiguous irreversible function of said transformation code, connected to said means for generating a secret transformation code, and connected to said means for generating start and stop commands, for adding said communication identification signal to said start and stop commands and synchronizing signals;

control unit means for actuating and deactuating said deciphering unit in accordance with incoming start and stop commands only upon correspondence between an internally generated communication identification signal and a received communication identification signal, in a receiving mode, connected to said deciphering unit and said means for producing.

4. A communication station as in claim 3, wherein said means for producing a communication identification signal further comprises a dividing unit for dividing the transformation code, supplied in the form of a binary polynomial, by a predetermined binary polynomial and generating said communication identification signal as a residual polynomial resulting from the division.

* * * * *